Figure 1:
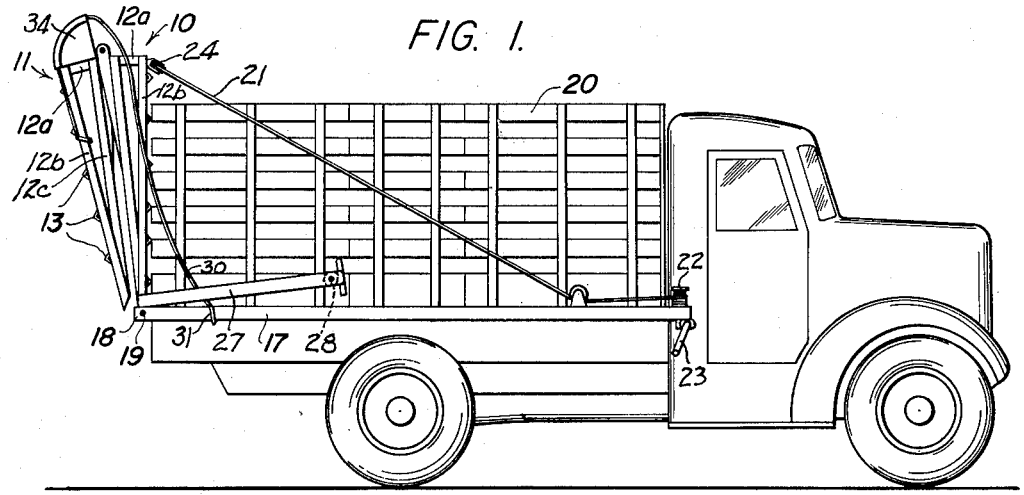

Oct. 25, 1955  L. L. ALLEN  2,721,758
COLLAPSIBLE TAIL-GATE RAMP FOR TRUCKS
Filed Oct. 18, 1952  2 Sheets-Sheet 1

Inventor:
LOUIS LYNN ALLEN,
Attorneys.

Oct. 25, 1955   L. L. ALLEN   2,721,758
COLLAPSIBLE TAIL-GATE RAMP FOR TRUCKS
Filed Oct. 18, 1952   2 Sheets-Sheet 2
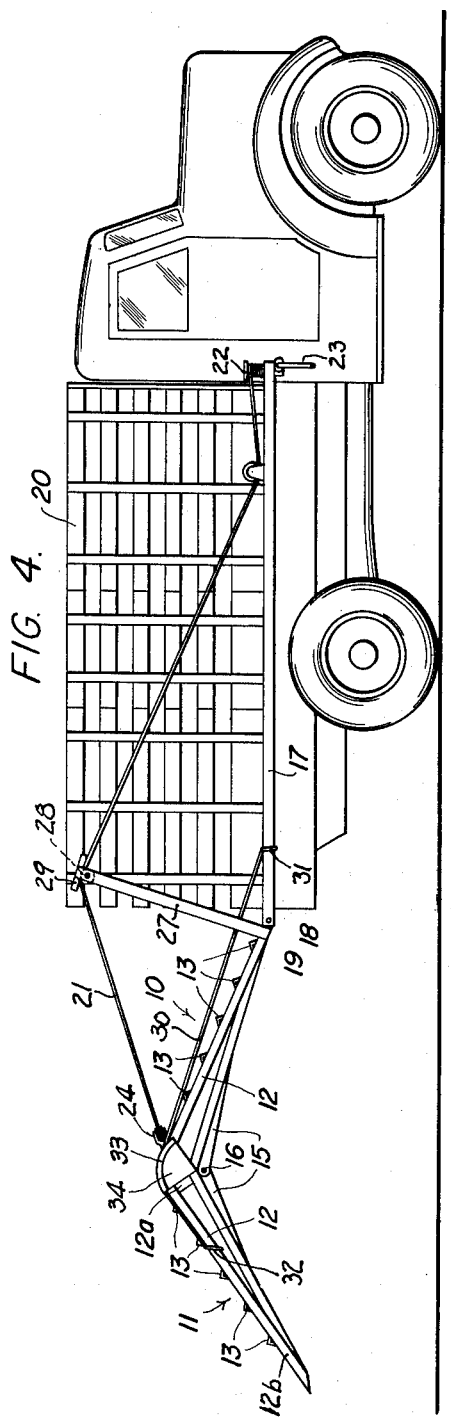
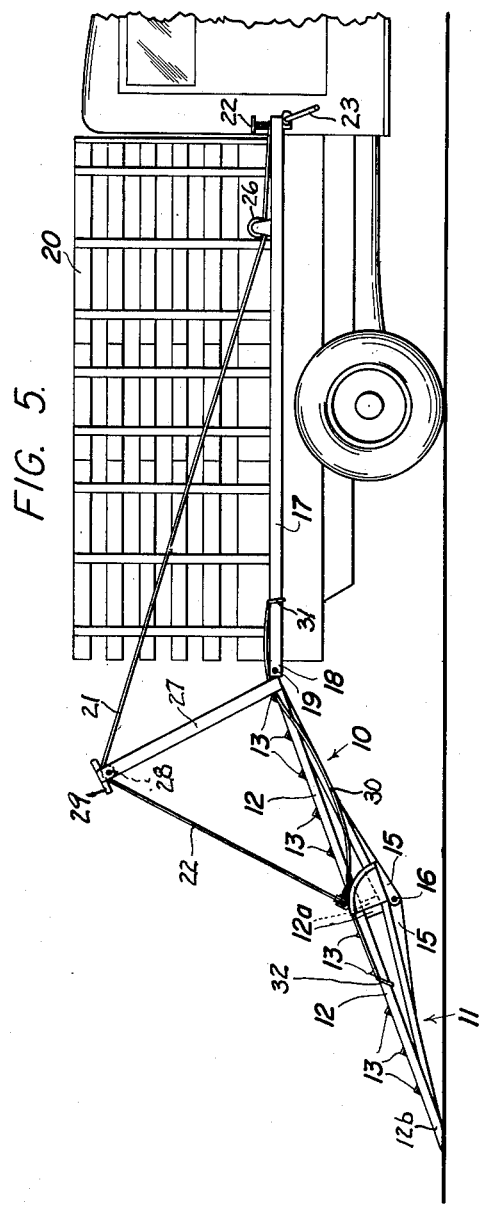
Inventor:
LOUIS LYNN ALLEN,
By Mallinckrodt and
Philip A. Mallinckrodt.
Attorneys.

United States Patent Office 2,721,758
Patented Oct. 25, 1955

2,721,758

COLLAPSIBLE TAIL-GATE RAMP FOR TRUCKS

Louis Lynn Allen, Salt Lake City, Utah

Application October 18, 1952, Serial No. 315,553

12 Claims. (Cl. 296—61)

This invention relates to combination tail-gate and ramp structures for trucks.

In the transporting of various types of heavy goods and equipment by truck, it is often very helpful to use a ramp for loading and unloading purposes. This is especially true when mobile equipment, such as tractors and other special earth-working equipment are to be transported from place to place. In such instances, the equipment is usually driven up a ramp and onto the receiving bed of the truck under its own power.

A ramp structure which is completely separable from the truck is often employed for this purpose. On the other hand, there have been some attempts made in the past to provide a ramp structure which is extendable to ramp formation and position from a normally maintained tail-gate formation and position. Such a structure is highly desirable, in that it serves two vital functions and is always available in operative attachment to the truck. Combination ramp and tail-gate structures as heretofore proposed have, however, been lacking in many desirable attributes. For example, they have been lacking in the structural strength necessary to support heavy loads, and have been awkward and difficult to change from tail-gate position to ramp position and vice versa.

I have now perfected a construction which leaves almost nothing to be desired. It is relatively light, structurally strong, and capable of supporting heavy loads in its extended, ramp position. It easily and quickly unfolds and drops to ramp position, largely by the force of gravity, but under close control of the operator. Also, it easily lifts and folds from ramp position to tail-gate position by winch operation, which may be manually or power operated, and it is simple to install and operate.

Outstanding structural features of my invention reside in the provision of coacting sections of partial truss formation, pivoted together intermediate the length of the structure, so as to fold together when being raised from ramp position to tail-gate position, and so as to unfold when being lowered from the latter position to the former. The truss type of construction does more than contribute great structural strength in ramp position. It distributes the weight of the folded sections in tail-gate position in such a manner that there is a constant overhang of weight at the top of the gate, which is immediately effective to unfold and lower the gate structure whenever the force of gravity is permitted to become operative. Furthermore, by hinging the ramp sections together so that the hinge axis extends across and connects the lower chords of the several truss members making up the ramp sections, rather than the top chords thereof, broad web faces of the two sections abut in pressure relationship when the ramp is loaded, and contribute materially to the carrying capacity of the ramp.

While various elevating and lowering systems may be employed in connection with the collapsible ramp structure, a winch-actuated rigging system is preferred.

In general, it can be said that the rigging comprises two independent systems, one affording winch control for the lowering and raising of the structure, and the other serving automatically in conjunction with the first to effect the required unfolding and folding during the respective lowering and raising operations.

Further objects and features of the invention will become apparent from the following detailed description of the preferred form of structure illustrated in the accompanying drawings to exemplify the unique concepts of the invention.

Figure 2:
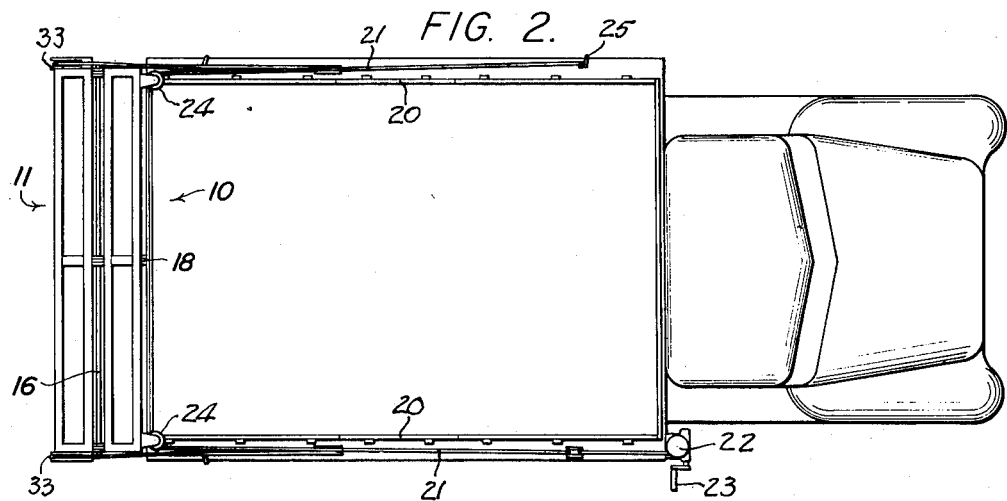
Figure 3:
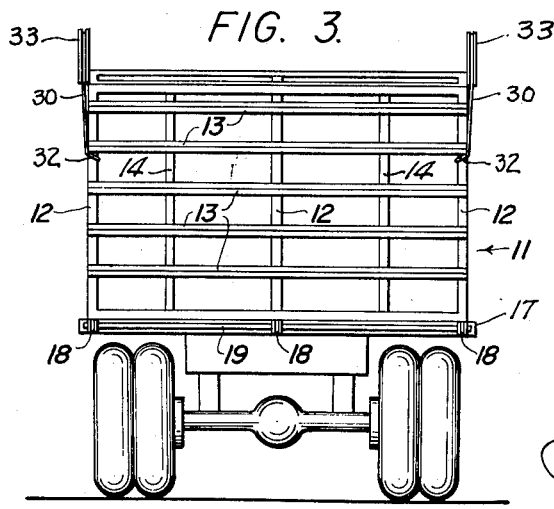

In the drawings:

Fig. 1 represents a side elevation of a truck equipped with my combination tail-gate and ramp structure, such structure being shown in its raised and collapsed tail-gate position;

Fig. 2, a top plan view of the truck and of the structure of the invention;

Fig. 3, a rear elevation of the same;

Fig. 4, a view corresponding to that of Fig. 1, but illustrating the structure partially lowered and unfolded at an intermediate stage of its change from tail-gate to ramp; and Fig. 5, a view corresponding to Fig. 4, but illustrating the structure of the invention completely lowered and unfolded into operable ramp position.

Referring to the drawings:

In the particular form illustrated, the tail-gate ramp structure of the invention comprises two ramp sections 10 and 11, each comprising supporting framework of partial truss formation, so as to coact, when the structure is extended and lowered into ramp position, to provide a trusswork spanning the distance from the ground to the level of the bed of the truck, see Fig. 5.

Each of the ramp sections 10 and 11 is preferably fabricated from structural steel angles, and, in the form illustrated, includes a set of three elongate, triangular frames 12, Figs. 3 and 4, similarly disposed in side-by-side, mutually spaced relationship.

Each of the triangular frames 12 comprises a relatively short leg member 12a, Fig. 1, for serving as a king-post member in a truss of inverted king formation, Fig. 5, when the ramp is extended, and comprises, further, a relatively long leg member 12b, for receiving and supporting transverse runway members 13. A diagonal member 12c completes the triangle.

The ramp sections 10 and 11 are preferably each reinforced by longitudinal beam members 14 disposed between adjacent frames 12. The runway members 13 are secured, advantageously by welding, to the frame members and to the beam members, and are arranged sufficiently close together to provide an adequate supporting surface for any vehicle which is to travel up and down the ramp.

The two ramp sections 10 and 11 are hinged together at the apices formed by the king-post members 12a of the respective triangular frames 12 and the diagonals 12c thereof, as by means of ears 15 and an elongate pintle 16.

The inner ramp section 10 is hinged to the tail end of the truck bed or platform 17, as by means of transversely spaced sets of rearwardly extending ears 18, Fig. 3, and an elongate pintle 19.

Accordingly, the truss-like ramp structure is collapsible in its middle, and is capable of assuming a collapsed, elevated, tail-gate position between the stake sides 20 of the truck, with its center of gravity overhanging and offset rearwardly of its pivot axis 19, so that it is normally off-balance and in position to automatically unfold, see Fig. 1, and is capable, further, of assuming an extended, lowered, ramp position between ground level and the level of the truck bed or platform 17.

An important feature of the invention is the system of rigging whereby the tail-gate ramp structure is easily and conveniently lowered from tail-gate position to ramp position and elevated from ramp position to tail-gate position, as desired.

Such rigging comprises a cable, pulley, and winch system, and, in the form illustrated, includes an operating cable 21, anchored to and wound, at one of its ends, upon a winch 22, which is shown as manually operable by a crank 23, but which may be power operated in any suitable and well known manner, if desired.

The operating cable 21 extends around the rear end of the truck, passing over a pair of oppositely disposed pulleys 24, which are attached to the inner ramp section 10 at respectively opposite sides and at the outer or king-post end thereof.

The other end of such operating cable 21 is securely attached to an anchorage member 25, which may be a hook or an eye screwed into the truck body at a forwardly disposed location on the side of the truck opposite that on which the winch 22 is located. Thus, in the illustrated instance, the operating cable 21 is arranged in substantially rectangular loop formation, with attachments to the truck at its forward ends and with attachments to the tail-gate ramp structure at the rearward closed portion of the loop.

It can be seen, then, that operation of the winch handle 23 in one direction will unwind cable from the winch drum, permitting the tail-gate ramp structure to lower, while operation in the opposite direction will wind up cable and elevate such structure. It should be understood that the winch 22 embodies a pawl and ratchet arrangement, or its equivalent, so that the winch drum will be locked in position at any given elevation of the tail-gate ramp structure, particularly the completely elevated, tail-gate position. Since such pawl and ratchet arrangement normally forms a part of conventional winch devices, it is not detailed here.

Operating cable 21 preferably passes under an idler and guide pulley 26 disposed adjacent the winch, and lies within the path of movement of a pair of standards 27, which are secured at respectively opposite sides of the inner ramp section 10, adjacent the pivotal or hinge attachment thereof to the rear end of the truck platform 12, and which extend substantially perpendicularly therefrom so as to lie longitudinally along the truck bed 17 when the tail-gate ramp structure is in elevated tail-gate position, as shown in Fig. 1, and to rise into cable-engaging position as the structure is lowered into ramp position, see Figs. 4 and 5.

Such standards 27 carry, at their upper ends, respective pulleys 28, which engage respective longitudinally extending reaches of operating cable 21 as the standards 27 are raised into the path of action of such operating cable. Respective guide lips 29 are preferably also provided at the upper ends of standards 27, to form respective entry throats for facilitating engagement of the pulleys with the cable. In this way, the operating cable 21 is maintained in most effective operating position at all times during the lowering and raising of the tail-gate ramp structure.

In order to automatically extend the tail-gate ramp structure into ramp position as it is lowered by the operating cable 21 and winch 22, the rigging system includes a pair of independent cables, indicated 30, respectively, anchored at their forward ends to the truck body, preferably the bed 17 of the truck, as shown at 31, and anchored at their rearward ends to the outer ramp section 11 of the tail-gate ramp structure, preferably to and intermediate the lengths of the long leg members 12b of the outermost triangular frames 12, as indicated at 32. Such cables 30 pass over respective arcuate slideways 33, which are provided by sector plates 34 secured to the king-post ends of the outer ramp section 11 at respectively opposite sides thereof. They are of such length as to hang slack in the tail-gate position of the structure, Fig. 1, but to become taut and exercise upward pull on the outer ramp section 11 intermediate the descending travel of the structure.

In the operation of the apparatus, rotation of the winch 22 in the direction which lengthens the operating cable 21, permits the overhanging weight of the tail-gate ramp structure, in its tail-gate position of Fig. 1, to descend under the influence of gravity. As the structure lowers in this manner, cables 30 become taut and act to positively unfold the ramp section about its hinge axis 16, see Figs. 4 and 5.

Abutment of the king-post bases of the two ramp sections in the completely unfolded, ramp position of the structure, Fig. 5, provides a ramp runway of king-post truss formation which is structurally adequate to support heavy equipment, such as tractors, even though the component structural members thereof are comparatively lightweight.

Tractors and other heavy mobile equipment may be driven under their own power up the ramp runway and onto the bed 17 of the truck.

When the ramp has served its purpose, it may be elevated to the tail-gate position of Fig. 1 by proper operation of the winch 22.

While a winch-actuated rigging system of the type illustrated forms a very effective operating combination with the truss-like tail-gate ramp, the latter may be satisfactorily operated in many instances by other well-known types of actuating mechanism, for example, by a hydraulic system.

Whereas this invention is here illustrated and specifically described with respect to a preferred construction thereof, it should be realized that various changes may be made therein without departing from the scope of the claims.

I claim:

1. A collapsible tail-gate ramp, comprising independent ramp sections; means hinging said ramp sections together transversely of the ramp length, so as to place said sections in end-to-end abutting, ramp position when extended, and into collapsed tail-gate position when folded along said hinge means; hinge means at the free end of a terminal ramp section, providing for hinge attachment of said tail-gate ramp to a supporting structure; pulley means secured adjacent the opposite end of said terminal ramp section; a winch adapted to be secured to said supporting structure; a cable passed through said pulley means and having one of its ends attached to said winch; means for attaching the other end of said cable to said supporting structure; and flexible connection means secured to the opposite terminal ramp section, forwardly of the free end thereof, and adapted to be also secured to said supporting structure, said flexible connection means having an effective length such as to hang slack in the said collapsed tail-gate position of the ramp and to become taut intermediate the movement of said ramp sections to extended ramp position, for automatically unfolding said ramp sections into extended ramp position as they move from collapsed, tail-gate position during conversion from tail-gate to ramp.

2. The combination recited in claim 1, wherein the ramp sections are so formed that the center of gravity of the tail-gate structure provided thereby is disposed rearwardly of the hinge axis of the said terminal ramp section hinge means, so that said structure will automatically unfold under the influence of gravity.

3. The combination recited in claim 2, wherein the said ramp sections are of partial truss formation, respectively, and form a ramp having complete truss formation when placed together in said end-to-end abutting ramp position.

4. The combination recited in claim 3, wherein said ramp sections consist of a pair of similarly formed ramp sections, each made up of a transverse series of elongate, triangular frames joined together by transversely extending frame and runway members, the bases of said triangular frames forming king-post members, and the said pair of ramp sections forming a truss of inverted king formation when extended into ramp formation.

5. A collapsible tail-gate ramp, comprising a pair of independent ramp sections; means hinging said ramp sections together transversely of the ramp length, so as to place them in end-to-end abutting, ramp position when extended, and into collapsed tail-gate position when folded along said hinge means; hinge means at the free end of one of said ramp sections, providing for hinge attachment of said tail-gate ramp to a supporting structure; a pair of pulleys secured at respectively opposite sides of said one ramp section, adjacent the said hinge joinder thereof with the other ramp section; a winch adapted to be secured to said supporting structure, remote from said hinge attachment of the tail-gate ramp thereto; a cable passed through said pulleys, and having one of its ends attached to said winch; means for attaching the other end of said cable to said supporting structure, remote from said hinge attachment of the tail-gate ramp thereto and at the side of said supporting structure which is opposite that at which said winch is secured; and flexible connector means secured to the other ramp section, forwardly of the free end thereof, and adapted to be also secured to said supporting structure, said flexible connection means having an effective length such as to hang slack in the said collapsed tail-gate position of the ramp and to become taut intermediate the movement of said ramp sections to extended ramp position, for automatically unfolding said ramp sections into extended ramp position as they move from collapsed, tail-gate position during conversion from tail-gate to ramp.

6. The combination recited in claim 5, wherein a pair of standards are respectively secured to opposite sides of said terminal ramp section adjacent the said free end thereof, and extending approximately perpendicularly thereto from the runway face thereof, so as to rise into cable-engaging positions as the tail-gate ramp is lowered from tail-gate position to ramp position; and slideway guideway means on the respective standards adjacent the extended, free ends thereof, for directly engaging respectively opposite reaches of said cable.

7. The combination recited in claim 6, wherein the slideway guideway means constitute respective pulleys.

8. The combination recited in claim 5, wherein the flexible connector means comprise independent cables secured at one set of ends thereof to respectively opposite sides of the said other ramp section; and guide means are provided for said cables at respectively opposite sides of said other ramp section, at the hinged end thereof.

9. The combination recited in claim 8, wherein said guide means are respective sector plates, providing arcuate slideways for the respective cables.

10. The combination with a truck, of a collapsible tail-gate ramp, comprising a pair of independent ramp sections; means hinging said ramp sections together transversely of the ramp length, so as to place them in end-to-end abutting ramp position when extended, and into collapsed tail-gate position when folded along said hinge means; hinge means pivotally attaching the free end of one of said ramp sections to and along the rear end of the bed of said truck; a pair of pulleys secured at respectively opposite sides of said one ramp section adjacent the said hinge joinder thereof with the other ramp section; a winch secured to said truck adjacent the forward end of said truck bed; a cable passed through the said pulleys, and having one of its ends attached to said winch and the other of its ends attached to said truck adjacent the forward end of the truck bed at the side thereof opposite said winch; a pair of standards respectively secured to opposite sides of said one ramp section adjacent the said hinge attachment thereof to the truck bed, and extending approximately perpendicularly thereto from the runway face thereof, so as to rise into cable-engaging positions as the tail-gate ramp is lowered from tail-gate position to ramp position; slideway guideway means on the respective standards adjacent the extended, free ends thereof, for directly engaging respectively opposite reaches of said cable; and flexible connection means secured to the other of said pair of ramp sections, forwardly of the free end thereof, and secured to said supporting structure, providing a slack connector when the tail-gate ramp is in raised, tail-gate position, and a taut connector when the same is partially lowered therefrom, for automatically unfolding said ramp as it descends.

11. A collapsible tail-gate ramp, comprising a pair of independent ramp sections of partial truss formation, respectively, said ramp sections each having a broad web face at one end thereof defining the partial character of the truss formation; means hinging said ramp sections together at said broad web faces and transversely of the ramp length within the lower chord of said truss formation, so as to place said sections in end-to-end abutting, ramp position when extended, and into collapsible tail-gate position when folded along said hinge means; a second hinge means at the free end of one of said ramp sections, providing for hinge attachment to a supporting structure; and actuating mechanism for lowering and raising said ramp structure.

12. The combination recited in claim 11, wherein the truss formation is of inverted king-post character.

References Cited in the file of this patent

UNITED STATES PATENTS

| | | |
|---|---|---|
| 887,167 | Wilkes | May 12, 1908 |
| 1,655,686 | Artas | Jan. 10, 1928 |
| 1,949,172 | Miller | Feb. 27, 1934 |
| 2,215,631 | Young | Sept. 24, 1940 |
| 2,432,259 | Swennes | Dec. 9, 1947 |
| 2,587,265 | Wright | Feb. 26, 1952 |

FOREIGN PATENTS

| | | |
|---|---|---|
| 571,803 | France | Feb. 8, 1924 |
| 596,240 | France | Aug. 3, 1925 |